W. L. McDONALD.
HOISTING AND DISTRIBUTING APPARATUS.
APPLICATION FILED MAR. 21, 1918.
1,286,686.
Patented Dec. 3, 1918.
5 SHEETS—SHEET 1.
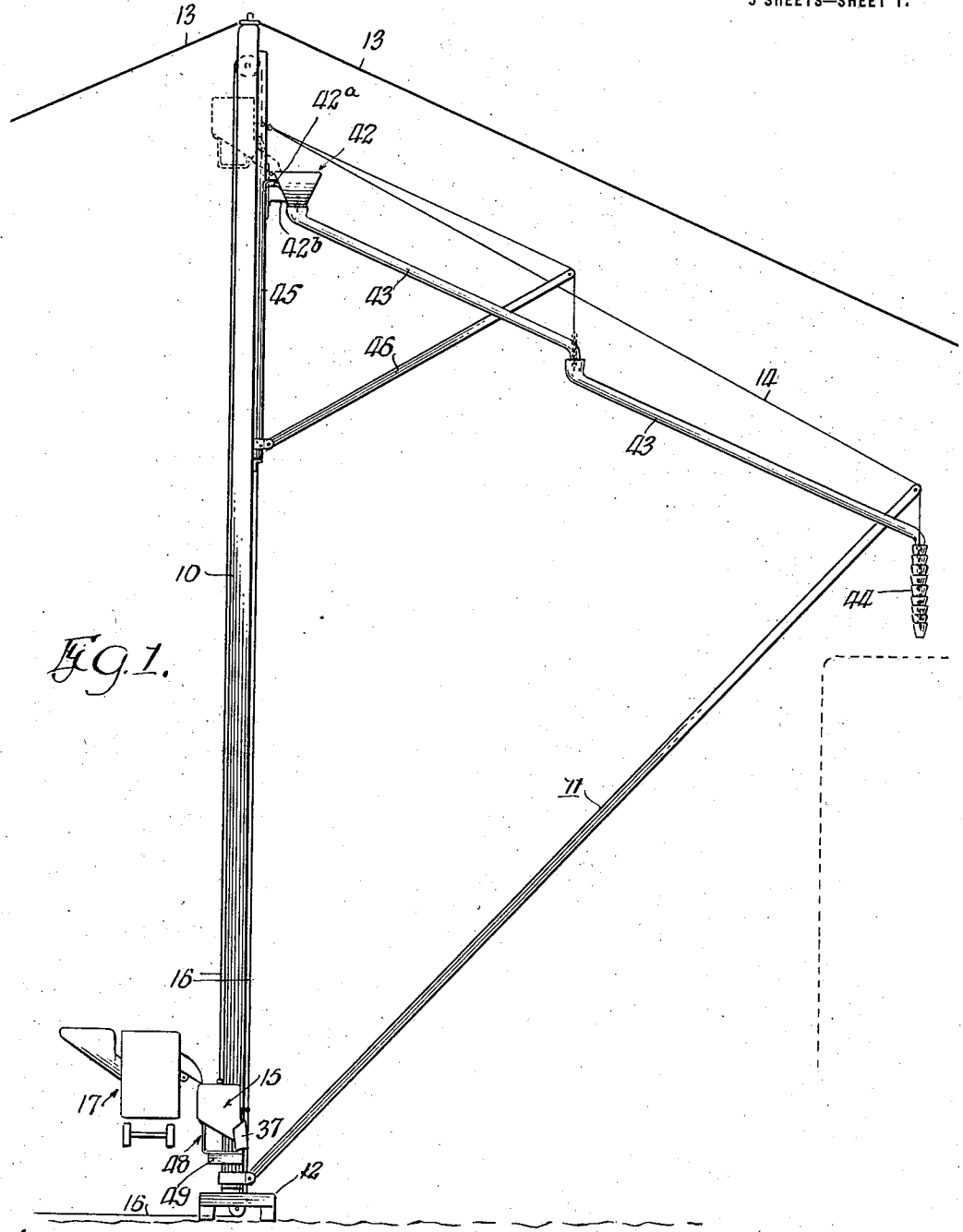

W. L. McDONALD.
HOISTING AND DISTRIBUTING APPARATUS.
APPLICATION FILED MAR. 21, 1918.
1,286,686.
Patented Dec. 3, 1918.
5 SHEETS—SHEET 2.
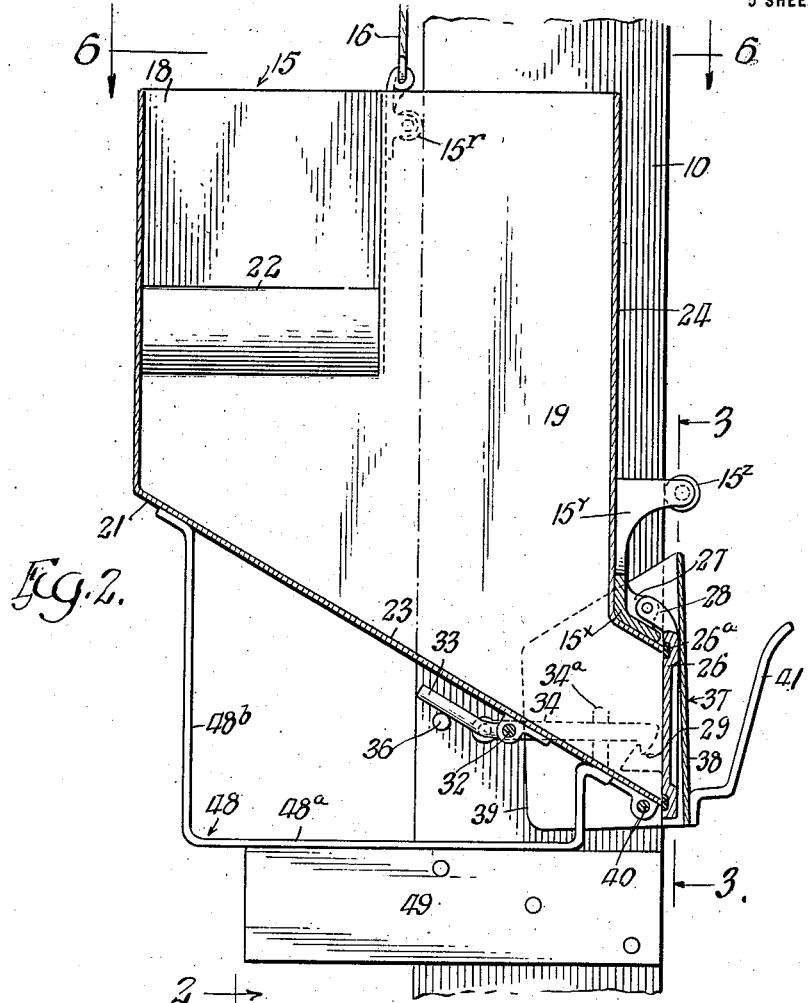
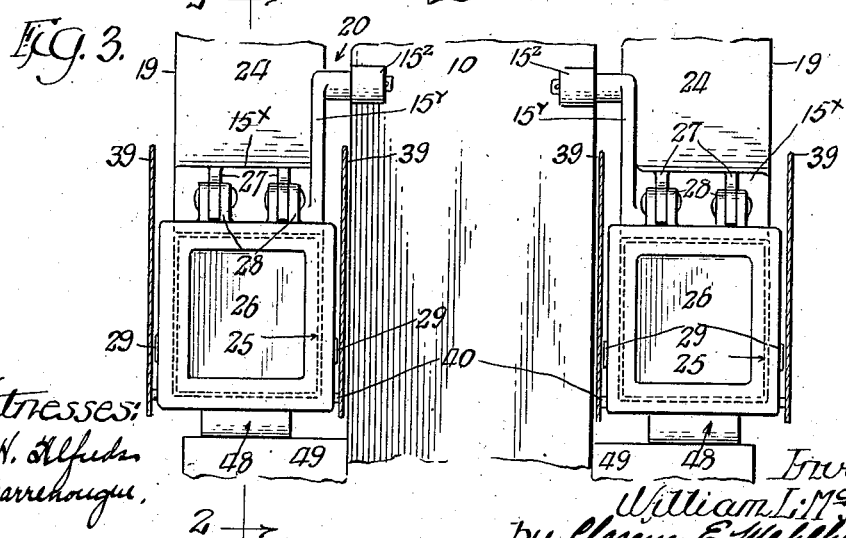

W. L. McDONALD.
HOISTING AND DISTRIBUTING APPARATUS.
APPLICATION FILED MAR. 21, 1918.
1,286,686.
Patented Dec. 3, 1918.
5 SHEETS—SHEET 3.
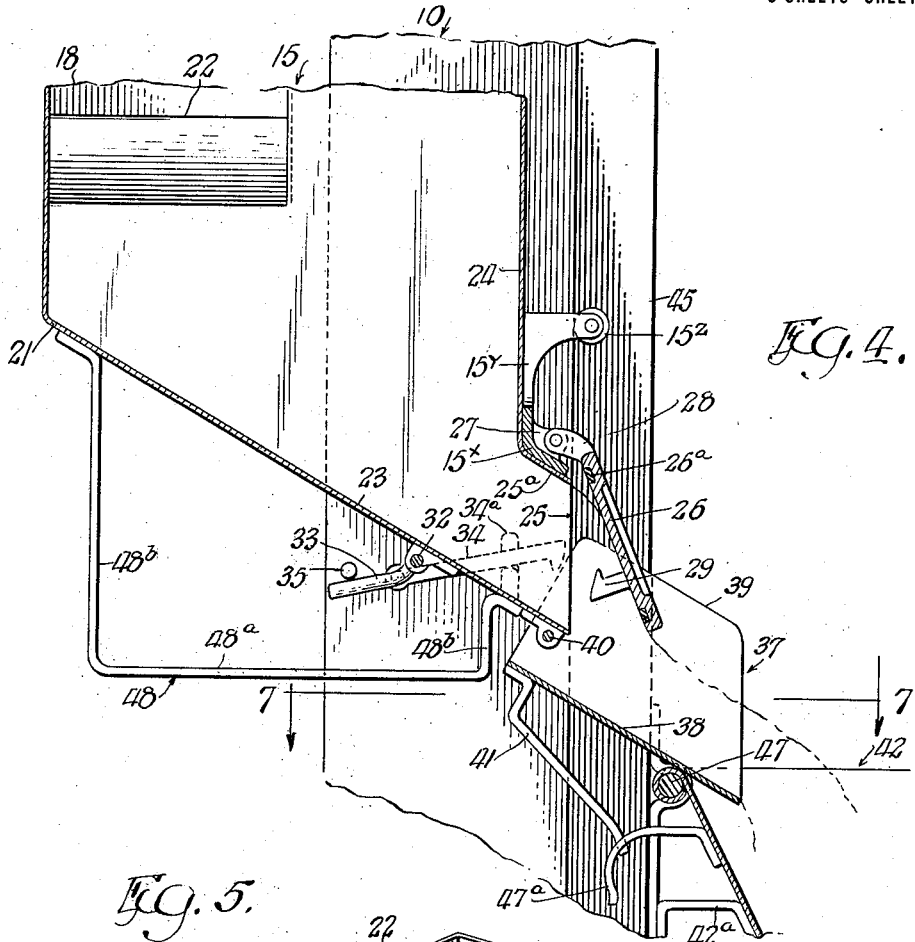
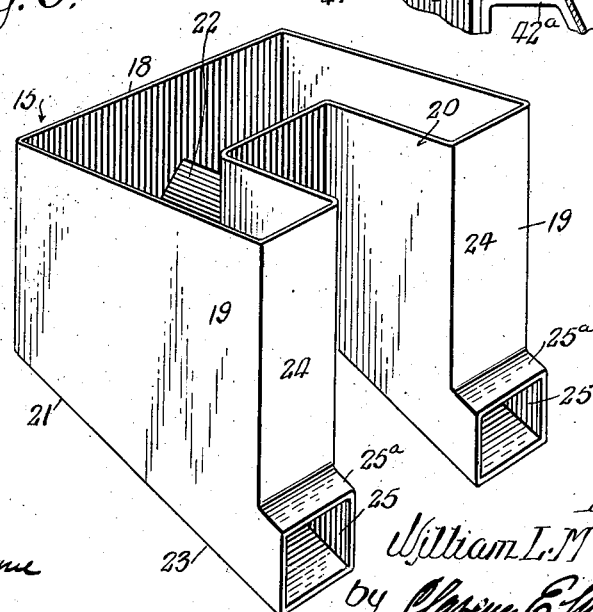

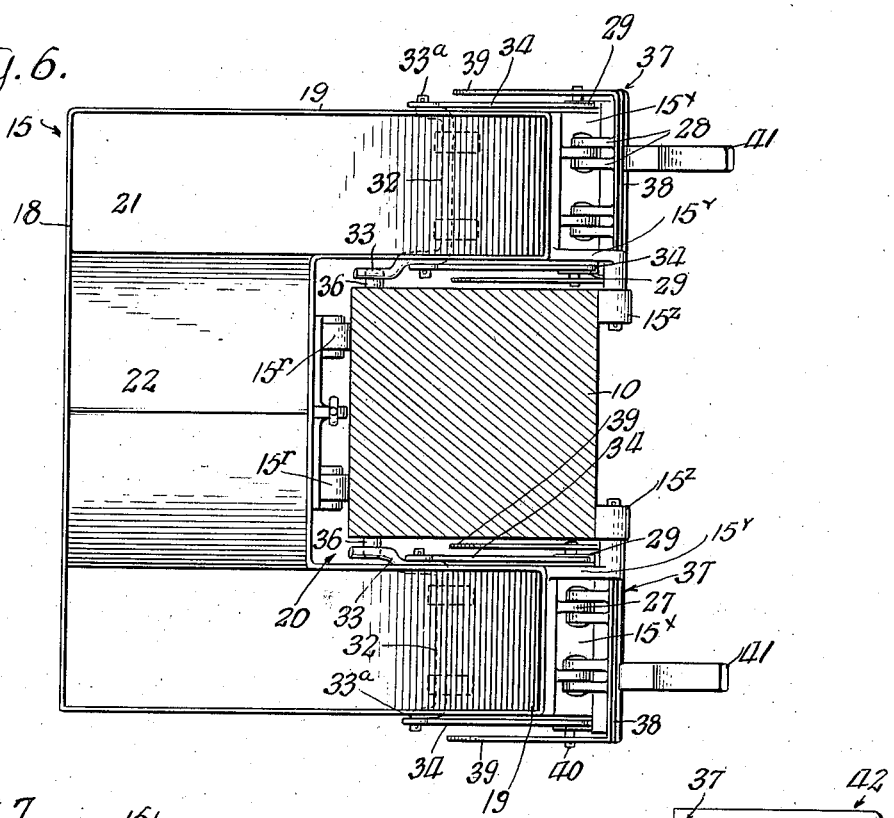

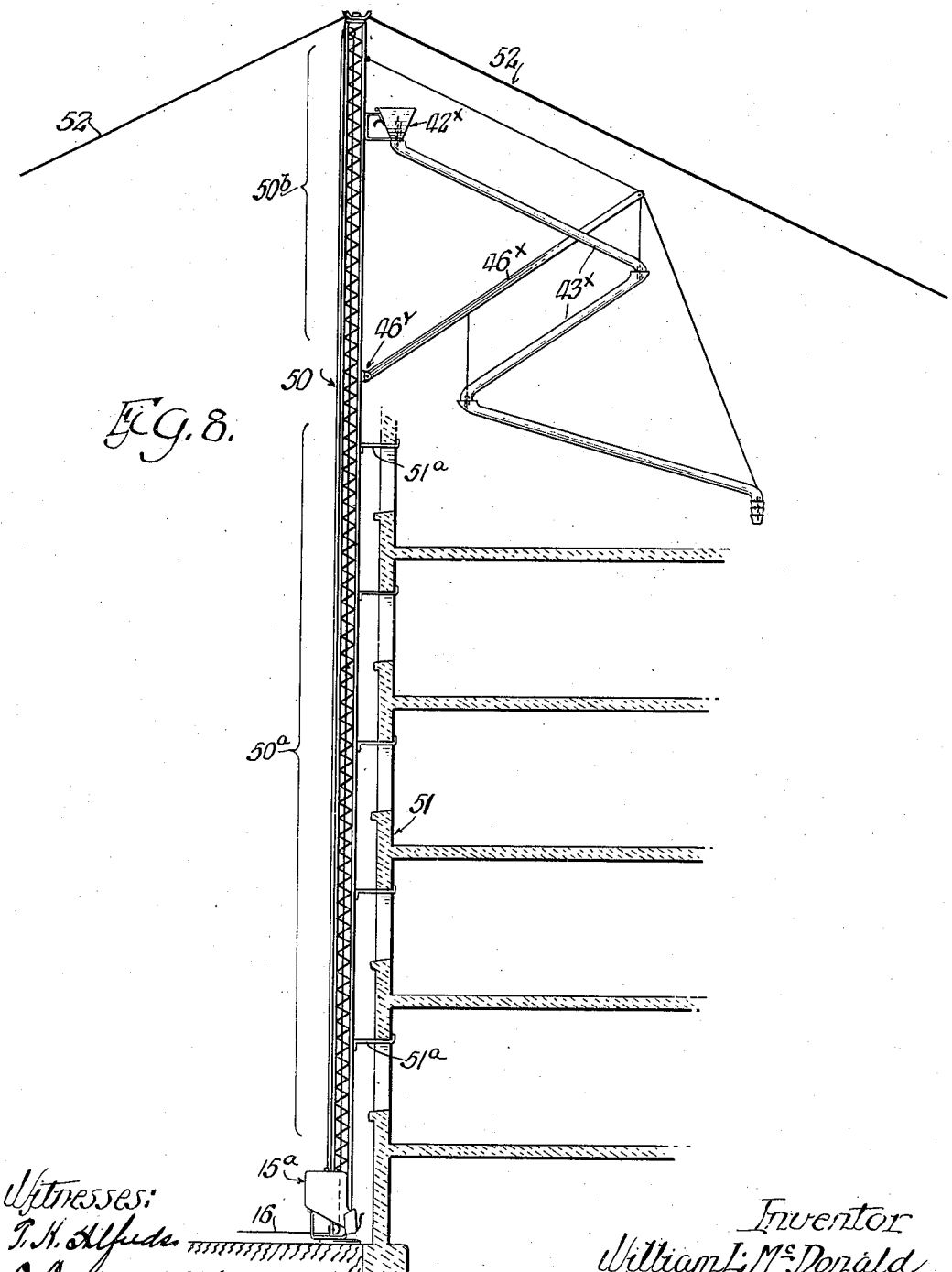

UNITED STATES PATENT OFFICE.

WILLIAM L. McDONALD, OF CHICAGO, ILLINOIS.

HOISTING AND DISTRIBUTING APPARATUS.

1,286,686.

Specification of Letters Patent.

Patented Dec. 3, 1918.

Application filed March 21, 1918. Serial No. 223,747.

*To all whom it may concern:*

Be it known that I, WILLIAM L. McDONALD, a citizen of the United States, and a resident of Chicago, in the county of Cook and State of Illinois, have invented certain new and useful Improvements in Hoisting and Distributing Apparatus, and I do hereby declare that the following is a full, clear, and exact description thereof, reference being had to the accompanying drawings, and to the letters of reference marked thereon, which form a part of this specification.

This invention relates to improvements in hoisting and distributing apparatus and consists of the matters hereinafter described and more particularly pointed out in the appended claims.

The invention relates to the type of hoisting and distributing apparatus finding its most familiar use in building operations where cementitious material, such as concrete and the like, has to be delivered over a comparatively large area, as in the construction of buildings, retaining walls, abutments and similar structures.

I am aware that apparatus of the kind comprising a hoisting mechanism or elevator, including an upright guiding member and a bucket to receive the material, an elevated chute, and conducting pipes or tubes with suitable booms for their support to deliver the material to the various points in the required area, has been heretofore constructed. But such apparatus has generally included a built-up tower or frame which involves not only the expense of its original cost, but also considerable expense for its erection at the place of use, with the result that contractors and builders find it lacking in economy in the case of comparatively smaller structures when compared to the use of labor and wheel-barrows.

Almost every job requires a derrick, with its mast and boom, and the primary object of my invention is to provide an apparatus of the kind, capable of use in connection with the mast of the derrick as the upright guide and support for the hoisting bucket, although as it will appear, it is not limited to such use. My apparatus, eliminating as it does, the necessity for the built-up shaft or tower, is by comparison much cheaper than apparatus heretofore employed, and may be used with economy on the structures covering a smaller area, such as piers, abutments, retaining walls and the like.

The many advantages of my invention will appear as I proceed with my specification.

In the drawings:

Figure 1 is a view in side elevation showing my improved hoisting and distributing apparatus as applied for use in connection with the familiar derrick.

Fig. 2 is a view representing, on an enlarged scale, a vertical section through the bucket of the hoisting apparatus, in a plane indicated by the line 2—2 of Fig. 3.

Fig. 3 is a view in partial rear elevation of the bucket showing its dumping gates.

Fig. 4 is a view of the bucket similar to that shown in Fig. 2, but with the bucket parts as they appear when dumping.

Fig. 5 is a perspective view of the bucket body.

Fig. 6 is a top plan view of the bucket with its gates closed, as it appears when applied to the mast of the derrick shown in cross section, the plane of the section being indicated by the line 6—6 of Fig. 2.

Fig. 7 is a view representing a transverse section through Fig. 4 in a plane indicated by the line 7—7 of Fig. 4.

Fig. 8 is a view representing a side elevation of the apparatus when applied to another type of upright guide or mast.

Referring now to that embodiment of my invention illustrated in the drawings and particularly in Figs. 1 to 7 inclusive:—10 indicates the mast or post of a derrick, and 11, its boom. The mast is mounted in a base block 12 and is held in erect position by means of guys 13, 13 the manner of mounting being such as to permit of its rotation upon its vertical, central axis. The elevation of the boom 11 is controlled by a wire rope or cable 14, operated by a windlass or hoisting drum (not shown) placed at the base of the mast. This is the general and usual construction and requires no further description.

15 indicates the bucket of the hoisting and distributing apparatus. Said bucket is constructed as will appear, to ride vertically upon the mast 10 and is adapted to be elevated by means of a rope or cable 16, from a position at the bottom of the mast (shown in full lines in Fig. 1) to a position (shown in dotted lines) at the top of the mast. 17 indicates the familiar concrete mixer, which is usually on wheels so that it may be brought to the desired position to discharge into the bucket of the elevating apparatus.

The bucket 15 is U-shape in cross section and comprises a main body part 18 and laterally spaced legs 19, 19. The body part is adapted to engage against one face of the mast and the legs are spaced apart a distance such that they may embrace the sides of the mast. Thus the body and the legs provide an open space 20, in which the mast may slide, speaking relatively, as the bucket is raised or lowered. The body of the bucket has a bottom wall 21 in which is formed a ridge 22 which extends parallel to the legs 19, 19 and from which said bottom wall is inclined downwardly in both directions, toward the sides of the bucket. The leg parts 19 of the bucket have bottom walls 23 which are inclined downwardly from the front of the bucket toward the rear, as indicated in Figs. 2 and 4.

24, 24 indicate the rear end walls of the bucket. In each of said walls is provided a gateway or opening 25 which is closed by means of a swinging gate 26. Each gateway or opening 25 is rectangular, as shown, and is defined by projecting flanges or ribs 25$^a$, so that the vertical plane of the gateway is offset from the plane of the rear end walls 24. The gate 26 closes against the edges of the flanges 25$^a$ and there is preferably provided a gasket 26$^a$ on the inner face of the gate to make a tight joint between the gate and said edges (see Fig. 2). The gate is hinged by means of suitable lugs and ears, 27, 28, respectively, to a bracket plate 15$^x$ fixed to the rear end wall 24 above the gate opening, in such manner that it will normally tend to hang in closed position.

To hold the bucket to the mast in its vertical riding movement thereon, the brackets 15$^x$ are provided with arms 15$^y$, which engage the rear marginal edges of the mast being preferably provided with antifriction rollers 15$^z$ to make easy riding. The brackets are made detachable so that the bucket may be applied to or disengaged from the mast when desired. Antifriction rollers 15$^r$ are also preferably provided on the rear wall of the bucket body for engagement with the front of the mast (see Fig. 6).

The gate 26 is wider than the associated gateway and has upturned dogs or hooks 29, 29 attached to its inner face near its bottom end in position to embrace the side walls of the bucket leg 19. A rock shaft 32, extending parallel to the plane of the gate 26, is mounted in suitable lugs attached to the bottom wall 23 of the leg 19. Said rock shaft has a pair of arms 33 and 33$^a$, the first at its inner end and next to the mast 16, and the second, at its outer end in the plane of the outer side wall of the bucket leg. Pivotally attached to said arms are downturned hooked dogs 34 that embrace the sides of the bucket leg and are adapted to engage the upturned hooks 29 on the gate to lock the gate 26 in closed position. Each hook 34 is supported near its rear end by a shouldered strap 34$^a$ which acts as a fulcrum when the rock shaft is rocked to raise or depress said hook. The rock arm 33 next the mast, is extended beyond its pivotal attachment to its associated dog 34 and is adapted to co-act with pins 35 and 36 fixed to the side of the mast. The pin 35 is located in a position to engage and operate the arm 33 to rock the shaft 32 and raise the locking bars or hooked dogs 34 from their engagement with the dogs 29 on the gate, when the bucket has been elevated to the desired position of discharge (see Fig. 4). The other pin 35 (see Fig. 2) is placed near the bottom of the mast and is adapted, upon the descent of the bucket, to operate the arm 33 to rock the shaft 32 to depress the hooks 34 and cause them to re-engage the gate hooks 29 when the bucket reaches its lowest position.

With each gate of the bucket is associated a chute to bridge the space between the plane of the gateway and the hopper into which the contents of the bucket are to be discharged. 37, 37 indicate said chutes (see Figs. 2 and 4). Each chute has a bottom wall 38, somewhat wider than the gate 26, and upright side walls 39, 39, which embrace the side edges of said gate. Said chute is mounted to swing from an upright, closed position (shown in Fig. 2), to a downwardly inclined, open position (see Fig. 4) on a rod 40 attached transversely to the bottom wall 23 of the associated bucket leg, but is so balanced on said rod that they will normally hang in the closed position shown in Fig. 2. A trip bar 41 is attached to the bottom wall of the chute and projects rearwardly therefrom when the chute is closed.

Near the top of the mast is located the usual hopper or receiving funnel and the discharge conduits or pipe sections which are connected thereto and which conduct the elevated material to a discharge nozzle placed at a point where it is to be delivered. 42 (see Fig. 1) indicates the hopper; 43 indicates the pipe sections (two in this case) connected thereto; and 44 indicates a discharge nozzle, the same being of any familiar construction.

The hopper 42 is attached by brackets 42$^a$, 42$^b$, to a short timber or post 45 secured to the rear face of the mast 16 in any convenient way. The upper pipe section 43 is attached at one end to the bottom of the hopper and at its other end is supported from the end of a donkey boom 46, pivotally mounted on the short post 45. The second pipe section 43 is supported from the end of the donkey boom and by the main boom 11, which also supports the discharge nozzle 44.

The trip bars 41 on the bottom walls of the chutes 37, 37 of the bucket, when the chutes are closed, project into and somewhat beyond the top edge of the front wall of the hopper 42. Said edge is reinforced by a rod 47, which acts as a bumper to be engaged by the said trip bars, in the upward movement of the bucket. By this engagement of the trip bars with the rod, the chutes 37 are thrown down into the open position shown in Fig. 4. At the same time, the rock arms 33, 33 strike the pins 36 and trip the locking mechanism of the bucket gates 36, thus releasing the gates, which are fully opened by the weight of the material in the bucket and said material then flows freely through the chutes 37, 37 into the hopper. The hopper is provided with forwardly projecting arms 47ᵃ which project into positions below the ends of the chutes when open, and act, in the descent of the bucket, to swing said chutes upwardly to a closed position as shown in Fig. 2.

To relieve the jar when the bucket reaches its lowermost position, and also to provide a supporting base for it, the bucket is provided on its bottom, under each leg, with a bumper 48. Said bumper is in the form of a bar bent to provide a horizontal base member 48ᵃ and upright members 48ᵇ of different lengths for attachment to the inclined bottom wall of the bucket leg. Said bumpers are adapted to engage and to rest upon blocks 49 attached to the sides of the mast at the bottom.

The operation of my hoisting and distributing apparatus is as follows. Assume that the bucket 15 is in a position at the bottom of the mast, with its base bar resting upon the blocks 41 provided therefor. In its descent to this position, the rock arms 33 have engaged the studs 35 and have thus caused the locking hooks or dogs 34 to engage the gate hooks 29 and to lock the gates in the closed position shown in Fig. 2. The concrete is discharged into the bucket 15 from the concrete mixer 17. When the bucket has been filled, the hoisting engine, through the rope or cable 16, draws the bucket 15 to the top of the mast. As the bucket passes above the hopper 42, the trip bars 41 on the chutes 33, strike the rod 47, thus throwing down the chutes, and about the same time the rock arms 33 strike the pins or studs 36 and trip the gate locking mechanism. The weight of concrete material in the bucket then opens the gates 26, thereby permitting the emptying of the bucket—the material dividing at each side of the ridge in the bottom wall of the bucket body and flowing down the inclined bottom walls of the legs of the bucket, through the chutes to the hopper and from the hopper into the conduit pipes. After the concrete has been emptied from the bucket 15, the doors 26 will swing in toward the gate openings 25 by gravity, ready to be locked tight, as already described, when the bucket reaches the bottom of the mast. The bucket is then lowered to the bottom of the mast, and in the beginning of its descent, the chutes 37 will engage the arms 47ᵃ on the hopper and will be thereby swung into upright or closed position. The operation then continues as before.

It is manifest that the bucket, the hopper and the distributing pipes may be made at a comparatively small cost and that they may be applied to any derrick construction that may be used even on the smallest job. Thus a contractor building on such a job, is enabled to use the improved apparatus with economy, where he would not be able to use it if its use required the erection of a built-up column, such as is employed in constructions heretofore in use.

While the bucket of my elevating and hoisting apparatus, is primarily intended for use with the mast of a derrick of the usual construction, as above described, it may also be used with any suitable mast, as for example, a built-up mast such as that shown in Fig. 8, in connection with a building and placed next one upright wall thereof. As shown in that Fig. (8), 50 indicates the mast which is built and added to as the upright wall 51 of the building progresses upwardly, the lower part 50ᵃ being attached at vertically spaced points by irons 51ᵃ to the building wall 51 and the upper part 50ᵇ that projects above said wall, being held by guys 52.

In this case 15ᵃ indicates the bucket and 42ˣ indicates the elevated hopper. 43ˣ indicates the distributing conduit pipes, of which, in this case, there are three shown. Said pipes are supported by a donkey boom 46ˣ pivoted to the part 50ᵇ of the mast above the building wall 51, at 46ʸ. No main boom is required in this case.

The other parts of the apparatus are constructed as heretofore described, and operate in a similar manner.

I claim as my invention:

1. An apparatus of the kind described, comprising in combination, an upright guiding member, a bucket vertically movable on and constructed to embrace the front and two opposite sides of said guiding member, said bucket having discharge openings substantially in the plane of the rear side of said guiding member, gates for closing said discharge openings, means at the bottom of said guiding member acting to close said gates, and means near the top of said guiding member acting to open said gates.

2. An apparatus of the kind described, comprising in combination, an upright guiding member, a bucket vertically movable on and constructed to embrace the front and two opposite sides of said guiding member, means for detachably locking said bucket in guiding relation to said guiding member, said bucket having discharge openings substantially in the plane of the rear side of said guiding member, gates for closing said discharge openings, means at the bottom of said guiding member acting to close said gates, and means near the top of said guiding member acting to open said gates.

3. An apparatus of the kind described, comprising in combination, an upright guiding member, a bucket vertically movable on and constructed to embrace the front and two opposite sides of said guiding member, said bucket having vertically arranged discharge openings in its rear side, gravity controlled gates for closing said discharge openings, and means on said bucket adapted to be engaged by co-acting means at the bottom and near the top of said upright guiding member to lock and unlock said gates as said bucket approaches the bottom and top of said guiding member, in its vertical movement thereon.

4. An apparatus of the kind described, comprising in combination, an upright guiding member, a bucket vertically movable on and constructed to embrace the front and two opposite sides of said guiding member, means for preventing a horizontal displacement of said bucket member relative to said guiding member, said bucket having discharge openings in one of its sides, gates normally closing said discharge openings, and co-acting means on said bucket and on the bottom and on the top ends of said upright guiding member, to automatically lock said gates in a closed position and to automatically unlock said gates from said closed position, as said bucket approaches the bottom and top of said guiding member, in its vertical movement thereon.

5. An apparatus of the kind described, comprising in combination, an upright guiding member, a bucket vertically movable on and constructed to embrace the front and two opposite sides of said guiding member, said bucket having a discharge opening, anti-friction means on said bucket adapted to engage said guiding member and to prevent a horizontal displacement of said bucket on said guiding member, a swinging gate member normally closing said discharge opening, a locking dog carried on said bucket for locking said gate in its closed position, and means on said guiding member near its top and bottom ends actuating said locking dog, to lock and unlock said gate as said bucket approaches the bottom and top of said guiding member in its vertical movement thereon.

6. An apparatus of the kind described, comprising in combination, an upright guiding member, a bucket vertically movable on and constructed to embrace the front and two opposite sides of said guiding member, said bucket having a discharge opening on each side of said guiding member, gates normally closing said discharge openings, rock shafts carried by said bucket, hooks on said gates, dogs operatively connected to said rock shafts and co-acting with the hooks on said gates for locking and unlocking said gates, and means at the bottom and at the top of the guiding member for rocking said shafts to disengage said dogs from and to engage said dogs with, the hooks on said gates.

7. An apparatus of the kind described, comprising in combination, an upright guiding member, a hopper near the top end of said guiding member, a bucket vertically movable on and constructed to embrace the front and two opposite sides of said guiding member, said bucket having discharge openings in its bottom end, gates normally closing said discharge openings, automatic means actuated in the descent of the bucket on the guiding member to lock said gate, automatic means operable when the bucket has reached the top of its ascent on said guiding member for unlocking said gates, and a swinging chute adapted to bridge the gap between said bucket member and said hopper when said bucket member is at the top of said guiding member.

8. An apparatus of the kind described, comprising in combination, an upright guiding member, a bucket vertically movable on and constructed to embrace the front and two opposite sides of said guiding member, and having discharge openings at each side of said guiding member, antifriction means on said bucket engaging said guiding member for preventing horizontal displacement of said bucket, gates for closing said discharge openings, means carried by said bucket and co-acting with fixed members on said guiding member for locking said gates when said bucket is at the bottom of said guiding member and for unlocking said gates when the said bucket is at the top of said guiding member.

9. An apparatus of the kind described, comprising in combination, an upright guiding member, a hopper on said guiding member near its top, a bucket vertically movable on and constructed to embrace the front and two opposite sides of said guiding member and having discharge openings at each side thereof, swinging chute members carried by said bucket below said discharge openings, gate members for closing said discharge openings, automatic means for locking and unlocking said gates as said bucket approaches the bottom and top ends of said guiding member, in its vertical movement thereon, and means on said chute members for engaging a fixed part of the hopper to swing said chute member into a position connecting said bucket with said hopper.

10. An apparatus of the kind described, comprising in combination, an upright guiding member, a hopper on said guiding member near its top, a bucket vertically movable on and constructed to embrace the front and two opposite sides of said guiding member and having discharge openings at each side thereof, chute members pivotally carried on said bucket and associated with the discharge openings thereof, gates for closing said discharge openings, automatic means for locking and unlocking said gates, and means on said chute members and on said hopper for tripping said chute members into a position connecting said bucket and said hopper and for swinging said chute members into a substantially upright position adjacent said gate.

11. An apparatus of the kind described, comprising in combination, an upright guiding member, a hopper mounted on said guiding member near its top, a bucket vertically movable on and constructed to embrace the front and two opposite sides of said guiding member and having discharge openings at each side thereof, gate members for closing said discharge openings, chute members carried by said bucket adjacent said discharge openings, automatic means for locking and unlocking said gates, and arms on said chute members and on said hopper for tripping said chute members into a position connecting said bucket and said hopper and for returning said chute members into a substantially upright position adjacent said gates.

12. An apparatus of the kind described, comprising in combination, an upright guiding member, a hopper mounted on said guiding member near its top, a bucket having laterally spaced legs adapted to embrace opposite sides of said guiding member, each leg of said bucket having a discharge opening, gate members for closing said discharge openings, a rock shaft fixed to each leg of said bucket, a dog operatively connected to each rock shaft, and adapted to engage a fixed part of said gates to lock said gates against the discharge openings, means on said guiding member for actuating said rock shaft to lock and unlock said gates, a normally upright chute member pivoted to each bucket leg, and means on said chute members adapted to engage a fixed part of the hopper to swing said chute members into a position connecting the branch parts of the bucket member and hopper, said last mentioned means operating before the gate is automatically unlocked.

13. An apparatus of the kind described, comprising in combination, an upright guiding member having stop blocks at its bottom end and having a hopper at its top end, a bucket vertically movable on said guiding member and having laterally spaced legs adapted to embrace opposite sides of said guiding member, a foot member fixed to each bucket leg, and adapted to engage said stop blocks, each lateral leg of the bucket having a discharge opening, a gate for closing each discharge opening, dogs mounted on each side of said laterally spaced leg, for locking and unlocking said gates, means on said guiding member for actuating said dogs, a normally upright chute member carried by each leg of the bucket, and means on said chute members adapted to engage said hopper for swinging said chute members into a position connecting the discharge ends of said bucket legs with said hopper.

14. An apparatus of the kind described, comprising in combination, an upright guiding member, a hopper mounted on said guiding member near its top, a bucket having laterally spaced legs vertically movable on said guiding member, said legs embracing opposite sides of said guiding member, each leg of said bucket having a discharge opening, antifriction guiding means on said bucket engaging said upright guiding member, a gravity closing gate for each discharge opening, automatic means for locking and unlocking said gate when said bucket is at the bottom and at the top of said guiding member, normally upright chute members associated with each leg part of the bucket, and means operating in the ascent of the bucket on said guiding member to swing said chute members into a position connecting the discharge openings in said bucket legs with said hopper.

15. An apparatus of the kind described, comprising in combination, an upright guiding member, a bucket having laterally spaced legs vertically mounted on said guiding member, said legs embracing opposite sides of said guiding member, each leg of the bucket having a discharge opening, a gate for each discharge opening, compressible means for sealing said discharge openings, locking dogs on said bucket for engaging said gates, and means at the bottom of said guiding member for actuating said locking bars to compress said sealing means fluid-tight about said discharge opening.

16. A bucket for a hoisting and distributing apparatus, comprising an open top casing having an inclined bottom wall, said casing including a main body part and laterally spaced leg parts arranged at an angle to and communicating with said main body part, means providing discharge openings in said legs, and means providing a ridge in said main body part which diverges toward the laterally spaced legs of said casing.

17. A bucket for a hoisting and distributing apparatus, comprising a substantially open top U-shaped casing having an inclined bottom wall, including a main body part and laterally spaced leg parts arranged at an angle to and communicating with said main body part, means providing a discharge opening at the bottom end of each leg part, automatic locking and unlocking gates, one for each discharge opening, means providing a fuel-tight seat between said gates and said discharge openings, when said gates are closed, and a ridge in said main body part which diverges toward the laterally spaced leg parts of the casing.

18. A bucket, comprising a body and laterally spaced legs projecting therefrom, said body and legs having connected inclined bottoms and having gateways adapted for the discharge of material from said inclined bottoms, normally closed gates hung from said legs for closing said gateways, trip actuated locking mechanism for each gate, and chutes, one associated with each gateway.

In testimony, that I claim the foregoing as my invention, I affix my signature in the presence of two witnesses, this 12 day of March, A. D. 1918.

WILLIAM L. McDONALD.

Witnesses:
　EARL D. BOWERSOX,
　LEILA C. REESE.